(12) United States Patent
Kurd et al.

(10) Patent No.: US 8,095,587 B2
(45) Date of Patent: Jan. 10, 2012

(54) PERFORMING ROUNDING IN AN ARITHMETIC OPERATION

(75) Inventors: Tariq Kurd, Bristol (GB); Mark O. Homewood, Somerset (GB)

(73) Assignee: STMicroelectronics (Research & Development) Ltd., Buckinghamshire (GB)

( * ) Notice: Subject to any disclaimer, the term of this patent is extended or adjusted under 35 U.S.C. 154(b) by 1169 days.

(21) Appl. No.: 11/479,933

(22) Filed: Jun. 30, 2006

(65) Prior Publication Data

US 2007/0043801 A1    Feb. 22, 2007

(30) Foreign Application Priority Data

Jul. 1, 2005    (EP) .................................... 05254151

(51) Int. Cl.
*G06F 7/38* (2006.01)
*G06F 7/52* (2006.01)
(52) U.S. Cl. ........................ 708/627; 708/551
(58) Field of Classification Search ........... 708/620–632
See application file for complete search history.

(56) References Cited

U.S. PATENT DOCUMENTS

| | | | | |
|---|---|---|---|---|
| 4,841,468 A | * | 6/1989 | Miller et al. | 708/625 |
| 4,864,528 A | * | 9/1989 | Nishiyama et al. | 708/493 |
| 4,876,660 A | * | 10/1989 | Owen et al. | 708/603 |
| 4,928,259 A | * | 5/1990 | Galbi et al. | 708/499 |
| 5,500,812 A | | 3/1996 | Saishi et al. | |
| 5,585,963 A | | 12/1996 | Suzuki | |
| 5,796,645 A | * | 8/1998 | Peh et al. | 708/603 |
| 5,909,385 A | * | 6/1999 | Nishiyama et al. | 708/630 |
| 6,148,319 A | | 11/2000 | Ozaki | |
| 6,269,384 B1 | | 7/2001 | Oberman | |
| 6,421,699 B1 | * | 7/2002 | Dhong et al. | 708/630 |
| 6,742,011 B1 | * | 5/2004 | Colon-Bonet et al. | 708/625 |
| 2005/0228845 A1 | * | 10/2005 | Pius Ng et al. | 708/627 |

OTHER PUBLICATIONS

Jalil Fadavi-Ardekani, M×N Booth Encoded Multiplier Generator Using Optimized Wallace Trees, IEEE, 1993, pp. 120-125.*
"Introduction of "Hot Ones" to Carry Save Adder Tree for Twos Complement Inputs", IBM Technical Disclosure Bulletin, vol. 32, No. 9B, Feb. 1990, p. 66-67.
Ayman Fayed, et al., "A Data Merging Technique for High-Speed Low-Power Multiple Accumulate Units", 2004 IEEE, p. 145-148.

* cited by examiner

*Primary Examiner* — Lewis Bullock, Jr.
*Assistant Examiner* — Kevin G Hughes

(57) ABSTRACT

An arithmetic unit comprising: an encoding circuit arranged to receive first and second operands each having a bit length of m bits and to generate therefrom a number n of partial products of bit length of 2m bits or less; an addition circuit having 2m columns each having n inputs, wherein bits of said partial products are applied to said inputs for combining said partial products into a result leaving certain of said inputs unused; and a rounding bit generator connected to supply a rounding bit to at least one of said unused inputs in one of said in columns at a bit position to cause said result to be rounded.

17 Claims, 9 Drawing Sheets

| | | | | | |
|---|---|---|---|---|---|
| 0 | | | | | |
| 0 | 0 | | | | |
| 0 | 0 | 0 | | | |
| 0 | 0 | 0 | 0 | | |
| 0 | 0 | 0 | 0 | 0 | |
| 0 | 0 | 1 | 0 | 0 | 0 | ← Column6
| | 0 | 1 | 1 | 0 | 0 | ← Column7
| | | 1 | 1 | 1 | 0 |
| | | | 1 | 1 | 1 |
| | | | | 1 | 1 |
| | | | | | 1 |

PERFORMING ROUNDING IN AN ARITHMETIC OPERATION

TECHNICAL FIELD OF THE INVENTION

This invention relates to generating a rounded result, particularly but not exclusively for multiplication.

BACKGROUND OF THE INVENTION

When operating with binary numbers representing fractional values, there is often a need to perform rounding on the number. This is particularly the case if a fractional number needs to be converted to an integer.

There are several different types of rounding schemes that can be used. For example a round-to-nearest scheme will round the fractional number to the nearest integer. Therefore, the number 2.4 is rounded to 2, and the number 2.6 is rounded to 3. A problem with a round-to-nearest scheme is that it has a bias towards rounding up the value, as results having a fractional part of exactly ½ (i.e. the number can be represented as ending in x.5 in decimal, where x is any number) are always rounded up, and therefore a larger proportion of fractional numbers are rounded up rather than down.

This problem with round-to-nearest can be overcome by using a round-to-nearest-even scheme. With the round-to-nearest-even scheme, if the result ends in exactly x.5, then the result is rounded to the nearest even number. For example, the number 1.5 is rounded up to 2, the number 2.5 is rounded down to 2, the number 3.5 is rounded up to 4, and the number 4.5 is rounded down to 4. Therefore, it can be seen that there is no overall bias to whether the number is rounded up or down.

Other rounding methods include: round-towards-zero, where positive numbers are rounded down and negative numbers are rounded up; round-towards-positive-infinity, where both positive and negative numbers are rounded up; and round-towards-negative-infinity, where both positive and negative numbers are rounded down.

Rounding often needs to be performed after an arithmetic operation, particularly but not exclusively multiplication. For example, two binary numbers may need to be multiplied and the result rounded. The instruction used to perform this operation is known as a MULFRAC instruction. FIG. 1 shows a typical arithmetic unit 100 for performing multiplication and rounding. Two 32-bit operands 102 and 104 are input to a multiplier array 106. The multiplier array 106 encodes the operands and produces partial products, which are then summed together, as is known in the art. The multiplication of two 32-bit numbers results in a 64-bit number. An example multiplier array may comprise a Booth recoder for encoding the operands and producing the partial products, and a Wallace tree for summing the partial products.

The use of a Booth recoder reduces the number of terms representing the operand. For example a 32-bit number may be reduced to 17 terms or fewer by a Booth recoder. The partial products are generated by multiplying the second operand by each of the Booth recoded terms to produce a partial product term. Therefore, if a 32-bit number is multiplied by an operand that has been Booth recoded to 17 terms, then 17 64-bit partial products are generated. These 17 partial products are then summed together. If a Wallace tree is used to sum the partial products then this produces 64 sum bits and 63 carry bits. These two sets of bits are shown at the output of the multiplier array 106.

The sum bits and the carry bits are then added together by an adder 108 to produce the final result of the multiplication. The final result is a 64-bit number. This number then needs to be rounded.

A round-to-nearest operation can be performed by adding the decimal value 0.5 to the result and removing the fractional part of the number. For example, if the decimal value of the multiplication result was 2.467, then this should be rounded to 2. By adding 0.5 to 2.467 the value is 2.967, and the integer part of the number is 2. If the decimal value of the multiplication result was 2.671, then this should be rounded to 3. By adding 0.5 to 2.671 the value is 3.171, and the integer part of the number is 3.

This can be performed on the binary number by having knowledge of the location of the radix point in the number. For example, if the radix point is between bits 30 and 31 in the multiplication result, then it is known that bit 31 represents the value 1 in decimal, and bit 30 represents the value 0.5 in decimal. Therefore, by adding a "1" bit to bit position 30 in the result, then the decimal value 0.5 is added to the result. This method works for both unsigned binary numbers and signed numbers using 2's complement arithmetic.

This operation is achieved in FIG. 1 by splitting the result of the multiplication into two groups of bits, as shown at the output of the adder 108. The first group of bits corresponds to bits 29 to 0 of the result. This group does not need to be processed further and is provided to the output of the system 100. The second group of bits corresponds to bits 63 to 30. These bits are input to an incrementer 110. The incrementer 110 increments the bits by one. Since bit 30 is the least significant bit provided to the incrementer 110, this is the equivalent of adding a "1" bit to bit position 30, and therefore adds 0.5 in decimal to the result. The outputs of the incrementer 110 are the incremented bits 63 to 30, which can then be joined to the remaining bits 29 to 0 to provide the overall rounded result.

The problem with the system shown in FIG. 1 is that additional logic delay is introduced into the system through the incrementer 110. The amount of logic delay introduced can be reduced by using a known system such as that shown in FIG. 2. This system 200 takes the same operands 102 and 104 and these are multiplied in the same multiplier array 106 as in FIG. 1. The output of the multiplier array 106 is input to a full adder block 202. Also input to the full adder block 202 is a binary number which is comprised of all zeroes except for a "1" at bit position 30. This can be represented as 0x0000000040000000 in hexadecimal. When the bits are summed in the full adder block 202 a "1" bit is added to bit position 30, which performs the rounding as described previously. The output of the full adder is then input to an adder 204 (similar to the adder 108 in FIG. 1) where the sum and carry bits are added to produce the final result.

As the delay through the full adder block 202 is less than that through the incrementer, a reduced amount of logic delay is introduced compared to the system shown in FIG. 1. However, performing the rounding process using the full adder block does nevertheless incur a logic delay.

FIG. 3 shows a known arithmetic unit for implementing the round-to-nearest-even scheme. As mentioned above, round-to-nearest-even is used where the number ends in exactly x.5. This can be slow to implement as the decision on whether to use the round-to-nearest-even scheme is only made once the value of the number is known, i.e. whether it ends in x.5.

The unit 300 shown in FIG. 3 performs a similar multiplication operation to that shown in FIG. 1. Two 32-bit operands 102 and 104 are input to a multiplier array 106, which outputs the sum and carry bits as described previously. The sum and carry bits are input to an adder 302, and these are summed to produce the result of the multiplication. The result of the multiplication then needs to be rounded, using the round-to-nearest-even scheme if applicable.

The decision on whether to use the round-to-nearest-even operation can be made by observing one bit to the left of the radix point and all the bits to the right of the radix point. For example, if the radix point is between bits 30 and 31 in the multiplication result, then bit 31 represents the value 1 in decimal. Furthermore, if bit 31 is set to "1" then it means that the number is odd, and if it is set to "0" then the number is even. Bit 30 represents the value 0.5 in decimal. Therefore, if bit 30 is set then the number may end in x.5. Bits 29 to 0 represent fractions less than 0.5, specifically ¼, ⅛, ¹⁄₁₆, . . . , ¹⁄₂₁₄₇₄₈₃₆₄₈ for bits 29, 28, 27, . . . , 0. Therefore, if bit 30 is set and all of bits 29 to 0 have the value zero, then the result ends in exactly x.5. If, however, any of bits 29 to 0 do not have the value zero, then the result does not end in exactly x.5.

The round-to-nearest-even operation then operates as follows. If all of bits 29 to 0 have the value zero and bit 30 is set, then the result is not rounded up if bit 31 is zero (i.e. the number is even). In other words, no rounding bits are added. In summary, if the number is of the form xxx . . . xx0.100 . . . 000 in binary (where x can be either a "1" or "0") then the number is not rounded.

However, if the result is not of the form xxx . . . xx0.100 . . . 000 then the result is always rounded up. For example, if all of bits 29 to 0 have the value zero and bit 30 is set, but bit 31 is set (i.e. the number is odd) then the number is rounded up. The rounding up is performed by adding a "1" bit into bit position 30 (i.e. the decimal equivalent of adding 0.5) as discussed with regards to FIGS. 1 and 2. Since it is known that the number is an exact multiple of 0.5 this increases the number to the next highest integer. In summary, if the number is of the form xxx . . . xx1.100 . . . 000 in binary (where x can be either a "1" or "0") then the number is rounded up by adding a "1" in bit position 30 to the right of the radix point.

Furthermore, if any of bits 29 to 0 do not have the value zero, then the number is not an exact multiple of 0.5, and then rounding is performed by adding a "1" bit to bit position 30, as was discussed with regards to FIGS. 1 and 2.

Referring back to FIG. 3, the output of the adder 302 is split into two sets of bits. The first set comprises bits 31 to 0. Of these bits, bits 29 to 0 are provided to the final output of the system 300. Bits 31 to 0 are also input to an examination block 304. The examination block 304 performs the decision discussed above. In particular, bits 29 to 0 are logically ORed together, to determine if they all have the value zero. The result of the OR of bits 29 to 0 is referred to as the "sticky bit". If the sticky bit is "0" and bit 30 is "1", then the round-to-nearest-even scheme is applied. Bit 31 is then examined to see if the result should be rounded up or not.

The output of the examination block 304 is a signal that is provided to an incrementer 306. The incrementer 306 takes as input the other set of bits from the adder 302. This set of bits comprises bits 63 to 30. The incrementer 306 performs the same operation as the incrementer in FIG. 1, in that it adds "1" to bit position 30. However, it only increments the bits if it is signalled to do so from the examination block 304. Therefore, if the examination block 304 determines that the number is an exact multiple of 0.5 and is even, then it signals to the incrementer 306 to not round the result. Otherwise, it signals to the incrementer 306 to round the result. The output of the incrementer 306 is the bits 63 to 30, which may be combined with the bits 29 to 0 and provide the output of the system 300.

The system shown in FIG. 3 can therefore implement the round-to-nearest-even operation, but does so at the cost of extra logic delay. It can be seen that two logic elements are needed following the adder 302. The operation of the examination block 304, in particular the determination of the sticky bit, adds to the logic delay.

It can therefore be seen that there is a need for a method to implement rounding schemes such as round-to-nearest and round-to-nearest-even as part of an arithmetic (particularly multiplication) operation, without incurring extra logic delay.

SUMMARY OF THE INVENTION

To address the above-discussed deficiencies of the prior art, an object of the present invention is to provide an arithmetic unit comprising: an encoding circuit arranged to receive first and second operands each having a bit length of m bits and to generate therefrom a number n of partial products of bit length of 2m bits or less; an addition circuit having 2m columns each having n inputs, wherein bits of said partial products are applied to said inputs for combining said partial products into a result leaving certain of said inputs unused; and a rounding bit generator connected to supply a rounding bit to at least one of said unused inputs in one of said m columns at a bit position to cause said result to be rounded.

In the described embodiment of the invention, the arithmetic unit is a multiplication unit.

Another aspect provides a method of generating a rounded result comprising: generating from first and second operands, each having a bit length of m bits, a number n of partial products of bit lengths of 2m bits or less; applying bits of said partial products to inputs of an addition circuit having 2m columns each having n inputs and combining said partial products into a result; applying a rounding bit to at least one unused input in said one of said m columns at a bit position to cause said result to be rounded.

In a particularly preferred embodiment the underlying concept of the above-mentioned aspects of the invention are combined so that in a multiplication unit according to the first aspect of the invention, there is provided circuitry for determining whether or not rounding is necessary, said rounding bit being applied if it is determined to be necessary and not applied otherwise.

In the described embodiment of the invention, the encoding circuit is a Booth encoder and the addition circuit is a Wallace tree.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have a property of, or the like; and the term "apparatus" and "controller" may be used interchangeably and mean any device, system or part thereof that controls at least one operation, such a device may be implemented in hardware, firmware or software, or some combination of at least two of the same. It should be noted that the functionality associated with any particular apparatus or controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a better understanding of the present invention and to show how the same may be put into effect, reference will now be made, by way of example, to the following drawings, in which like reference numerals represent like parts, and in which:

FIG. 8 shows an example multiplication array; and

DETAILED DESCRIPTION

FIGS. 4 through 9, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged arithmetic operation.

Figure 4:
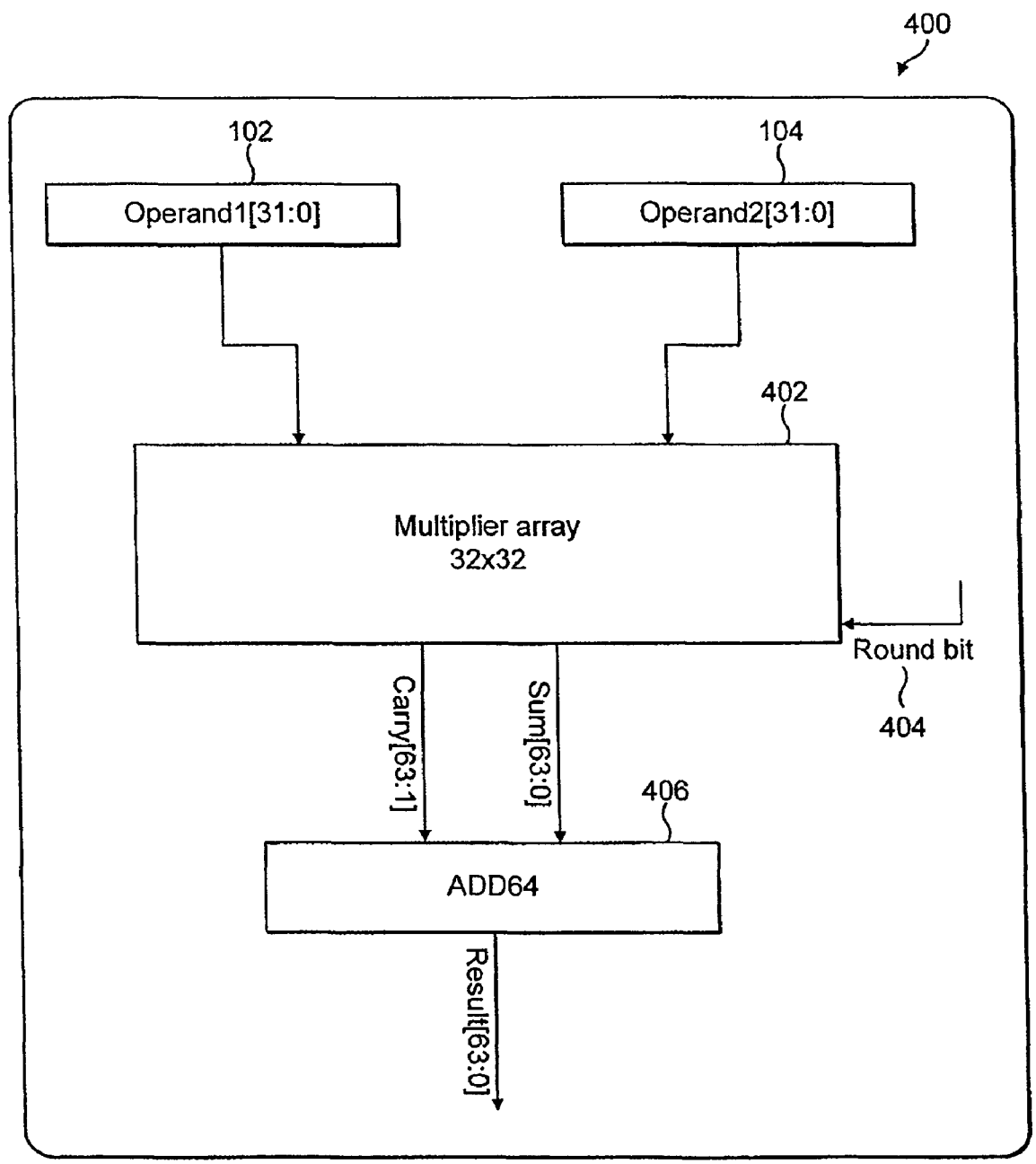
FIG. 4 shows a block diagram of a first embodiment of a unit for multiplication with rounding.

Reference will first be made to FIG. 4, which shows a block diagram of a first embodiment of the invention. The multiplication unit 400 multiplies two operands 102, 104 together and rounds the result, whilst avoiding the logic delays of the known schemes mentioned previously. In the embodiment shown here the operands are 32-bit numbers, but in other embodiments they could be formed of a different number of bits. In addition, in the embodiment shown the radix point is between bits 30 and 31 in the result of multiplication operation. In other embodiments the radix point could be in a different position, depending on bit length or different operand formats.

The two operands 102, 104 are input to a multiplier array 402. The multiplier array 402 performs Booth recoding and is followed by an array of adder cells forming a Wallace tree, as discussed previously. The multiplier array 402 also has a further input for a rounding bit 404, the operation of which will be described presently. The output of the multiplier array comprises 64 sum bits and 63 carry bits, as is known for the output of a Wallace tree, and these are input to an adder 406. The sum and carry bits are added and the output is the 64-bit result of the multiplication.

Figure 5:
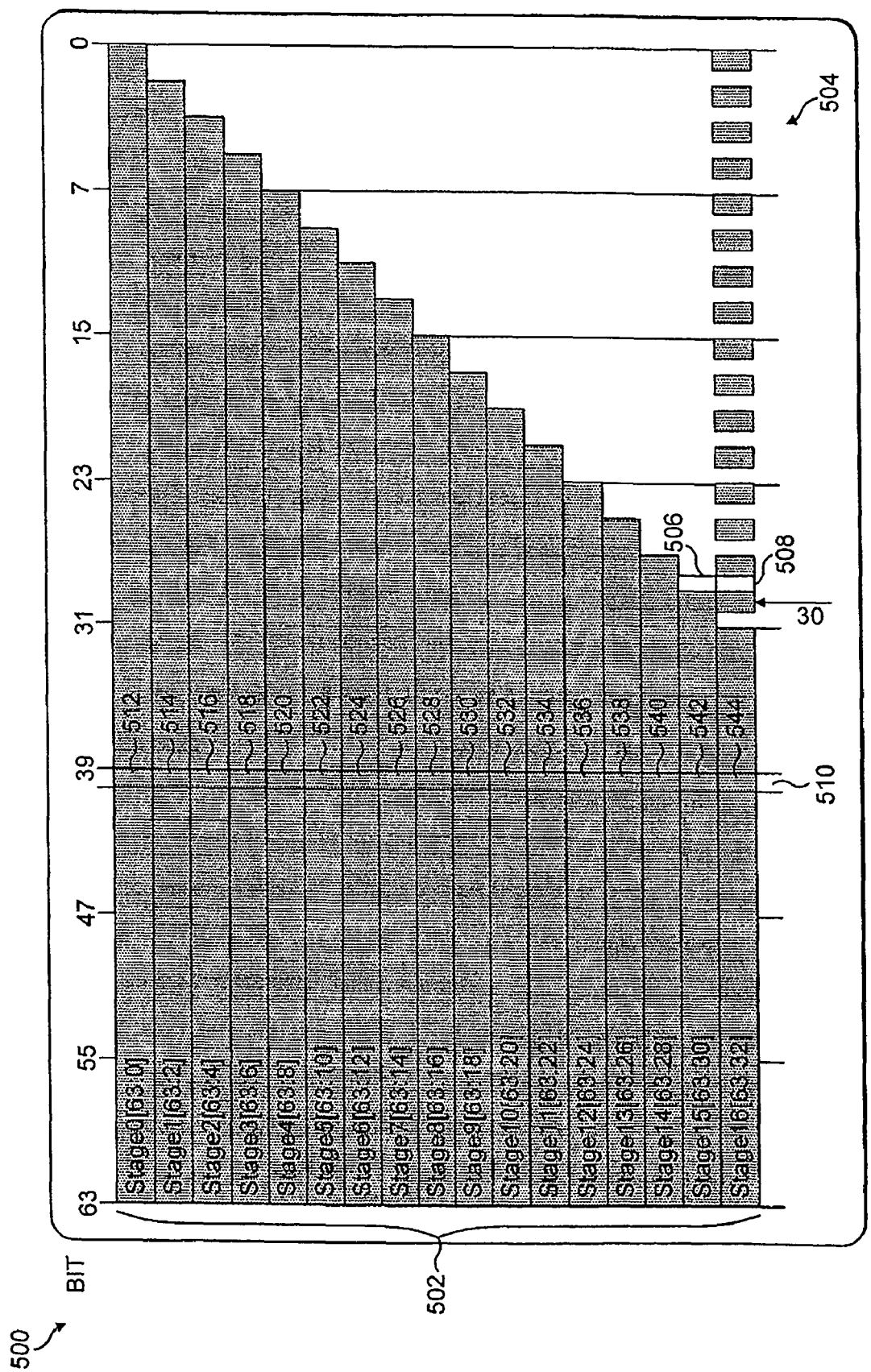
FIG. 5 shows the operation of the multiplication array in FIG. 4.

The operation of the Booth recoding can be seen in more detail in FIG. 5. The Booth recoding takes as input two 32-bit operands, as mentioned above. The result of the Booth recoding is an array of outputs 500 comprising 17 terms 502 and 16 carry bits 504. The terms are referred to in FIG. 5 as stages, with the bit length of each stage being denoted in square brackets, e.g. stage 0 [63:0] representing stage 0 (temp) with a bit length of 64 bits. A Wallace tree is used to add together the bits in each column of the array shown in FIG. 5. For example, a column 510 of the array is shown in FIG. 5. The Wallace tree adds each of the 17 bits in the column, labeled 512-544. This example column 510 is shown located at bit 40 of the terms in the array, but it will be readily appreciated by a person skilled in the art that the Wallace tree has columns for adding all the bits of the Booth recoding outputs 500.

Figure 6:
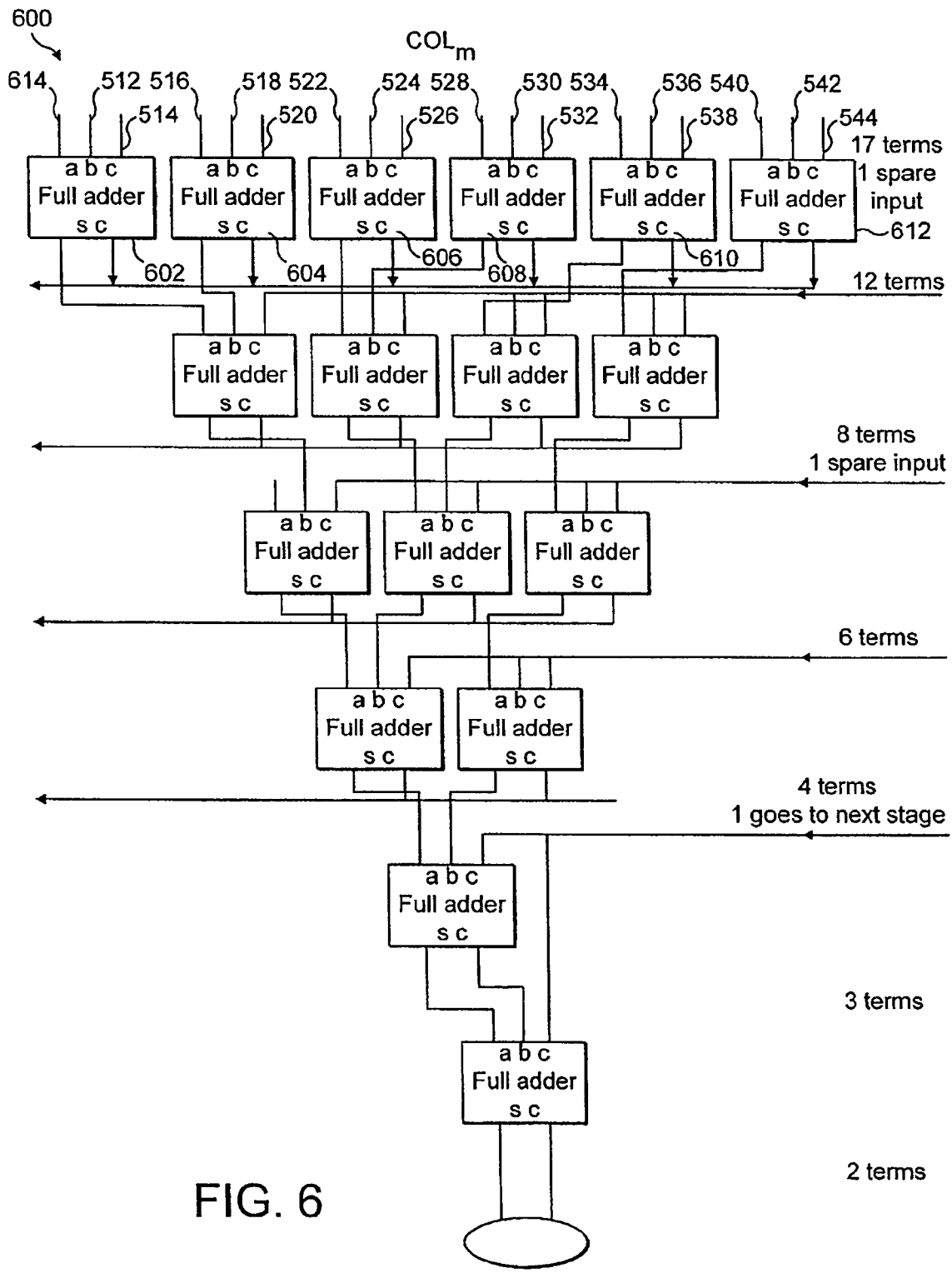
FIG. 6 shows the structure of a Wallace tree.

FIG. 6 illustrates one column $COL_m$ of a Wallace tree 600 which will add 17 terms of a column of the multiplication array 500 (such as the example column 510). To illustrate the operation, the Wallace tree 600 is shown summing the bits of the example column 510 of FIG. 5. The first level of the Wallace tree comprises six 3 bit adders 602 . . . 612 each having three inputs labeled a, b, c, a sum output s, and a carry output c. As there are seventeen terms, the first input of the first full adder 602 (labeled 614) is spare. Each of the 17 bits from the column of the array is input to the inputs of the adders 602 . . . 612. For example, in the case of the column 510 from FIG. 5, adder 602 has as input bits 512 and 514; adder 604 has as input bits 516, 518 and 520; adder 606 has as input bits 522, 524 and 526; adder 608 has as input bits 528, 530 and 532; adder 610 has as input bits 534, 536 and 538; and adder 612 has as input bits 540, 542 and 544. The Wallace tree then operates as is known in the art to sum the 17 bits to produce a sum bit and a carry bit.

Each of the columns of the array 500 is summed using a Wallace tree the same as that shown in FIG. 6. However, as can be seen in FIG. 5, not all of the 17 terms is 64 bits in length. Therefore, not all the columns to be added by a Wallace tree require the addition of 17 bits. However, as shown in FIG. 6, the Wallace tree nevertheless has 17 inputs available to be able to add 17 bits in each column. It can therefore be seen that there are unused inputs to the Wallace tree for certain columns of the array.

As was stated previously, the rounding operation may be performed by adding "1" to bit 30 of the result in this example. If the column of the array 500 that corresponds to bit 30 of the result did not contain the full 17 bits, then a "1" bit could be inserted into an input of the Wallace tree that was not required for summing the bits of the column. This bit is inserted into the unused input of the Wallace tree via the input 404 in FIG. 4. This extra bit would therefore be summed in the Wallace tree and the rounding would be performed as part of the multiplication process. Therefore, no extra logic delay would be incurred through performing the rounding after the multiplication.

However, as can be seen in FIG. 5, in this exemplary embodiment the column in the array in bit position 30 comprises a full 17 bits, and hence there are no unused inputs to the Wallace tree. Therefore, a bit cannot be inserted in this position to perform the rounding. However, in the column of the array in bit position 29, there are two bits 506 and 508 that are not used (i.e. only 15 bits need to be summed, rather than the full 17). Hence, it is possible to insert two bits into the inputs of the Wallace tree corresponding to these unused bits at bit position 29. This can be used to perform the rounding operation. Instead of the rounding operation being performed by adding 0.5 (in decimal) to the result, the rounding is now performed by adding 2×0.25 to the result, as bit position 29 represents the decimal value 0.25. The two extra bits are added by the Wallace tree as part of the multiplication process, and therefore the result is exactly the same as if a "1" bit had been added in bit position 30. This does not add any extra logic delay to the process. The two extra bits can be inserted into the unused inputs of the Wallace tree through the input 404 in FIG. 4.

Figure 7:
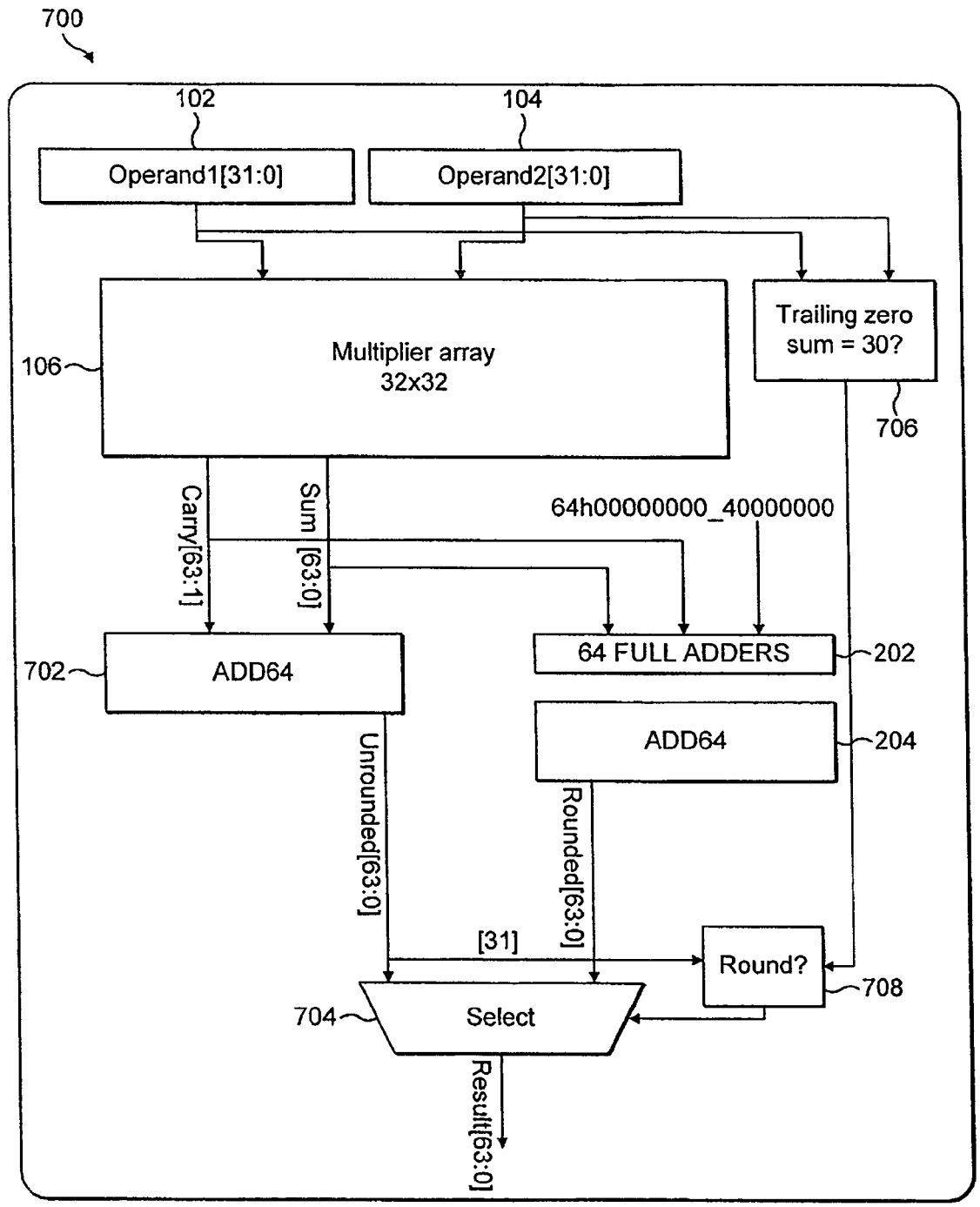
FIG. 7 shows a block diagram of another unit for multiplication with rounding to the nearest even number.
Figure 9:
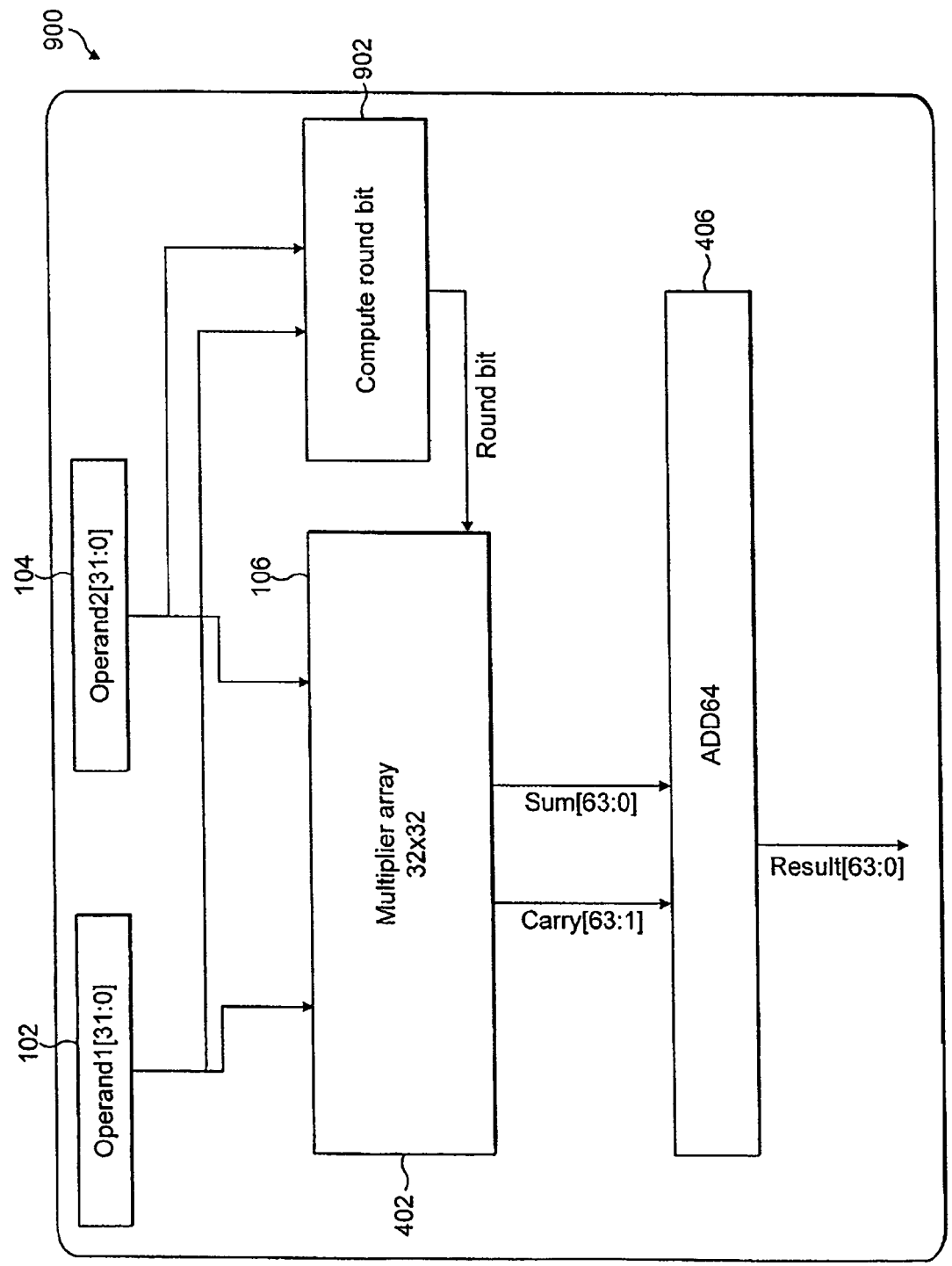
FIG. 9 shows a block diagram of a second embodiment of a unit for multiplication with rounding to the nearest even number.

Reference is now made to FIG. 7, which shows a unit 700 for performing multiplication and rounding the result to the nearest even number. As discussed previously, the result is rounded to the nearest even number if the result ends in exactly x.5, thereby avoiding bias to the result. Known methods of performing this operation incur extra logic delay. The unit 700 avoids some of this extra logic delay by determining whether a round to nearest even operation will need to be performed before the result of the multiplication operation is known.

Figure 1:
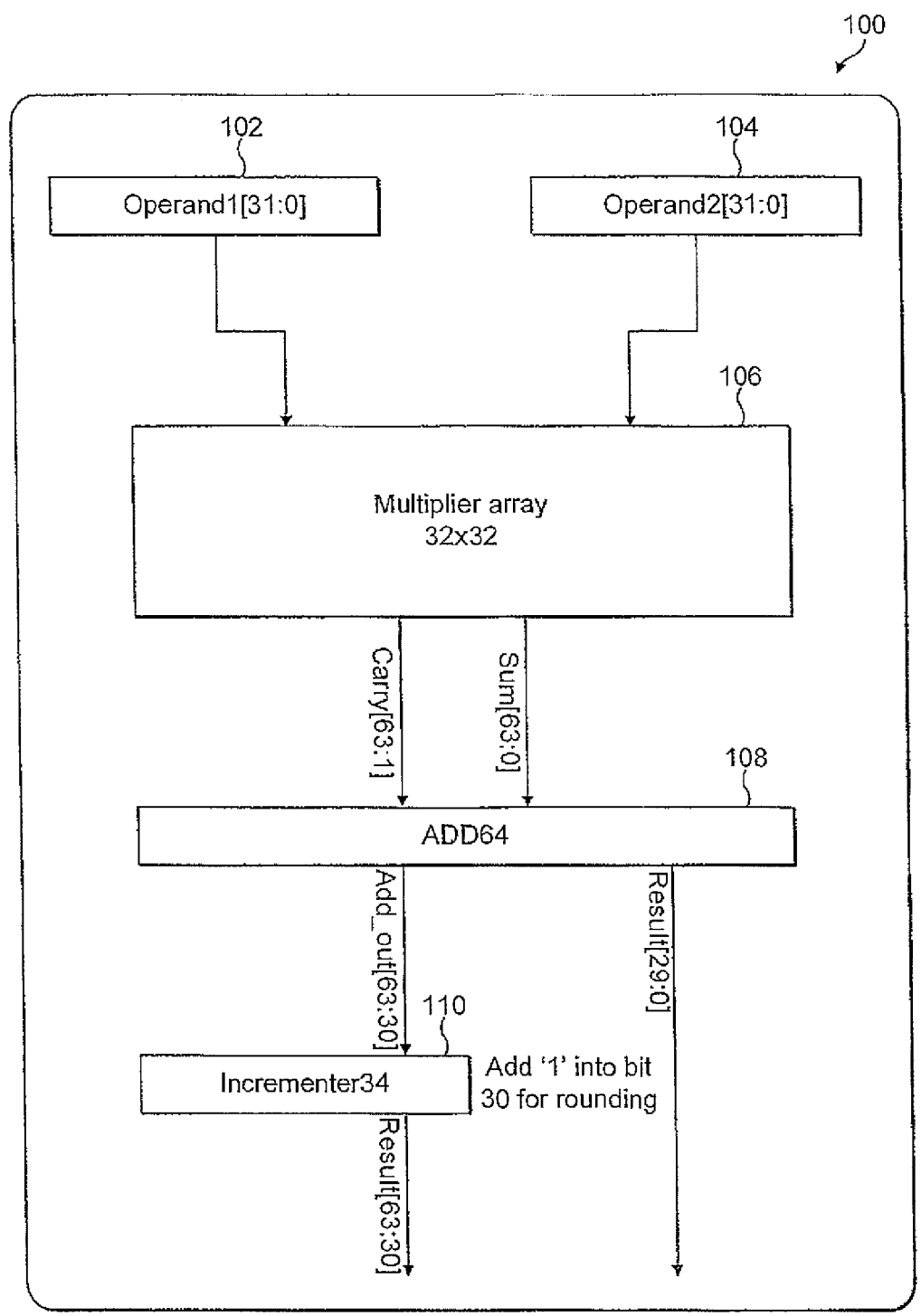
FIG. 1 shows a block diagram of a first known unit for multiplication with rounding.

The unit 700 takes as input two operands 102 and 104. In the unit 700 shown here the operands are 32-bit numbers, but they could be formed of a different number of bits. In addition, in the unit 700 shown here the operands have the radix point between bits 15 and 16, and the radix point of the result of the multiplication operation is between bits 30 and 31. However, the radix points could be in different positions. These operands are input to a multiplier array 106, which is of the same form as that shown in FIG. 1. The multiplier array shown here is formed of a Booth recoder and a Wallace tree.

Figure 2:
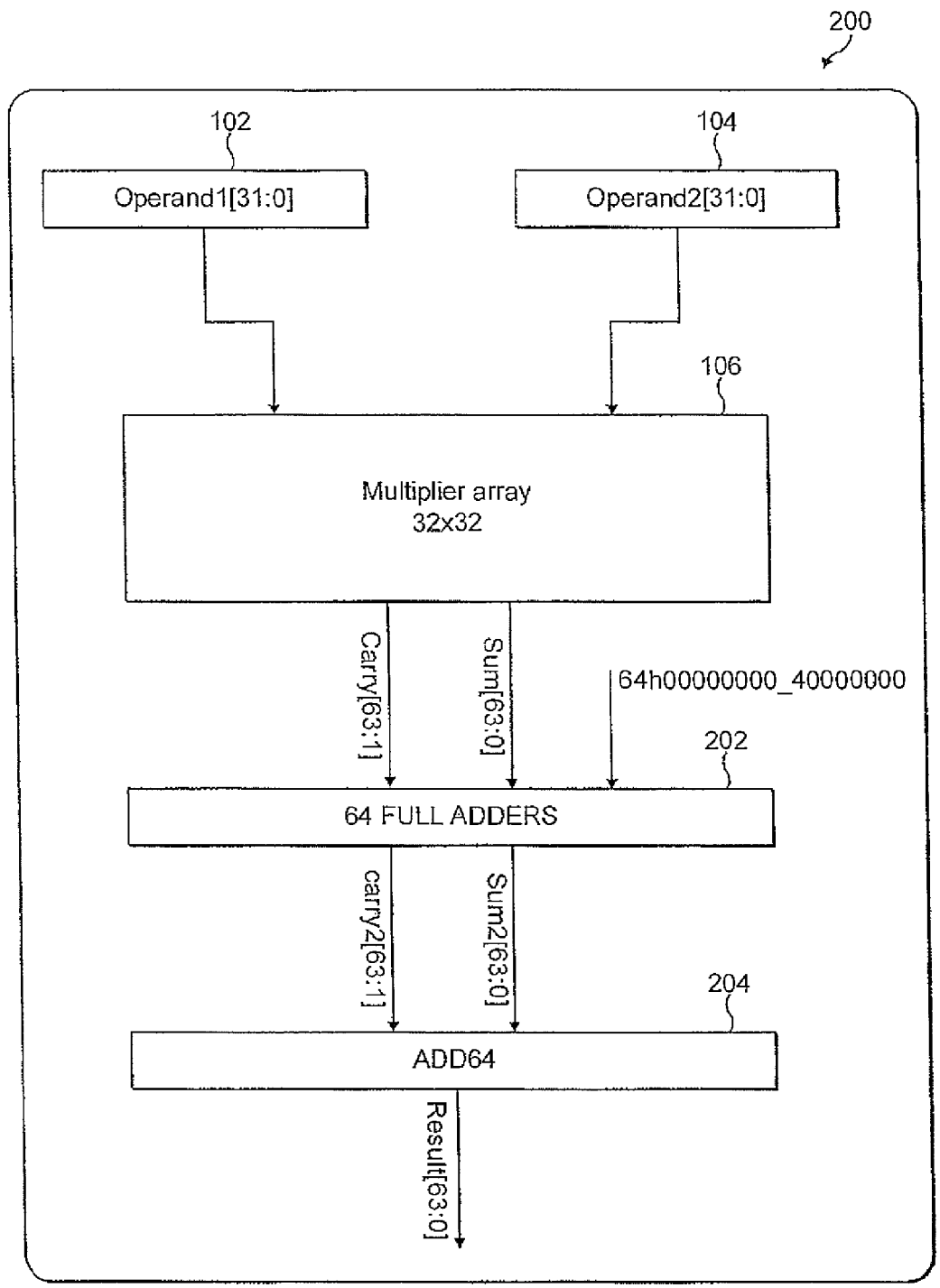
FIG. 2 shows a block diagram of a second known unit for multiplication with rounding.
Figure 3:
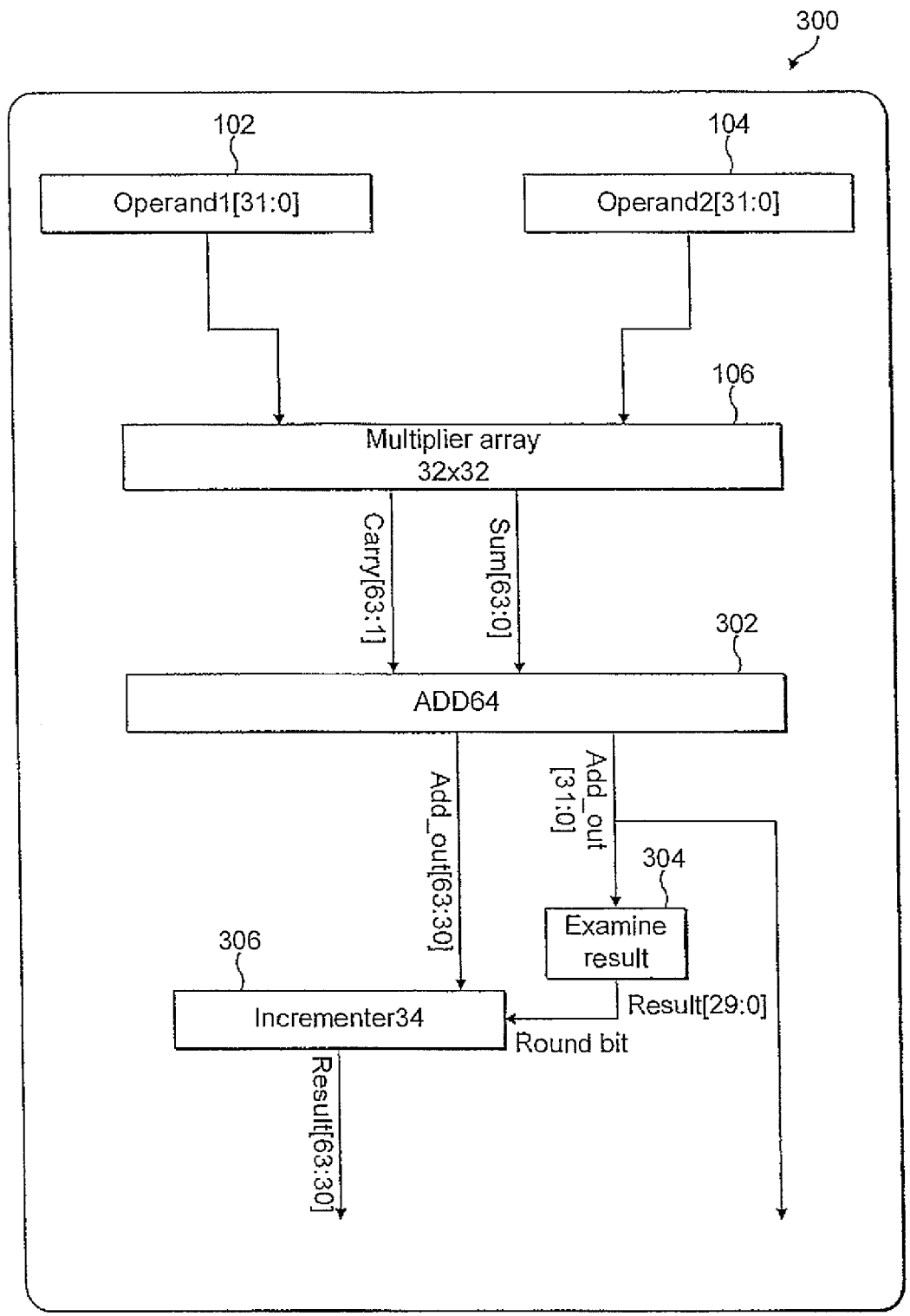
FIG. 3 shows a block diagram of a first known unit for multiplication with rounding to the nearest even number.

The output of the multiplier array comprises 64 sum bits and 63 carry bits, as is known for the output of a Wallace tree. The next stage of the multiplier splits into two parallel sections. The first section adds the sets of sum and carry bits together at an adder 702 to produce an unrounded multiplication result. In parallel with this the sum and carry bits are input to a full adder block 202, which is the same as that shown in FIG. 2. Also input to this full adder is a number that has a "1" bit at bit position 30 (which can be represented as 0x0000000040000000 in hex). When these numbers are added this rounds the result as was described previously. The output of the full adder 202 is input to an adder 204, which produces the rounded multiplication result.

The unrounded multiplication result from the adder 702 and the rounded multiplication result from the adder 204, which were both calculated in parallel, are input to a selector unit 704, which selects which of the two multiplication results will be used. The selection decision is based on the determination of whether the result ends in x.5. The determination of this is performed in parallel with the multiplication process, so as to avoid incurring any extra logic delay.

The total number of trailing zeroes in each of the operands 102 and 104 are found in block 706. Using this information, the number of zeroes that will be present at the end of the multiplication result can be found by adding up the number of zeroes at the end of each operand. If the total number of trailing zeroes is exactly 30, then this means that the multiplication result will have 30 trailing zeroes, implying that bits 29 to 0 will all be zero, and bit 30 is "1". The result of this is that the "sticky bit" is not set, and the result of the multiplication will end in x.5. If the total number of zeroes is less than 30 then bits 29 to 0 will not all be zero, and hence the multiplication result will not end in x.5. If the number of trailing zeroes is greater than 30, then bit 30 is "0", and hence the multiplication result will not end in x.5.

The information regarding whether there are 30 trailing zeroes is fed to block 708 which makes the rounding decision. If there are not exactly 30 trailing zeroes, then block 708 sends a signal to the selector 704 to choose the rounded result as the final output result. This is because the multiplication result does not end in x.5, and hence the result is rounded without considering the nearest even number.

If there are exactly 30 trailing zeroes, then block 708 needs to determine whether or not to select the rounded or unrounded result. In order to determine this block 708 also takes as input bit 31 from the unrounded result. Bit 31 is the first bit to the left of the radix point, and by examining this bit it is possible to determine whether the result is odd or even. If bit 31 is a "1" the result is odd, whereas if bit 31 is "0" the result is even. Block 708 signals the selector 704 to choose the rounded multiplication result (which has been rounded up) if bit 31 shows an odd result. For example, if the decimal value is 1.5 it is rounded to 2. Alternatively, if bit 31 shows an even result the unrounded result is selected. For example, if the decimal value is 2.5 it is rounded to 2.

Therefore, the unit 700 shown in FIG. 7 provides an advantage over other known methods in that it provides for a much quicker decision making process by allowing the factors to be calculated in parallel, before the result of the multiplication is known. However, it still requires that bit 31 of the unrounded result is examined, which will add some logic delay to the operation.

In order to address the problem of examining bit 31 once the multiplication has been performed, a further enhancement can be made in order to calculate whether the result will be odd or even from the original operands 102 and 104. If it is detected in block 706 that the number of trailing zeroes is 30, then this means that bits 29 to 0 are zero and bit 30 is a "1". If this is the case then it is required to determine if the result is odd or even. It can be determined whether the result will be odd or even by observing the trailing "1" of each operand, and one bit to the left of the trailing "1". This operation is best described with an example.

In this example, 6-bit numbers will be used for simplicity, although it will be appreciated that the process will work for any number of bits. Consider a first number a=111000 multiplied by a second number b=111100. The multiplication array will take the form shown in FIG. 8. Since there are a total of five trailing zeroes in the two operands a and b, there will be five trailing zeroes in the result. This can be seen by the five columns of zeroes in the multiplication array 800. It is assumed for this example that the radix point is between bit 5 and 6. The trailing "1" comes from column 6, and this therefore shows that the result will end in x.5. To determine whether the result is odd or even, column 7 must be observed, as column 7 gives the value of the first bit to the left of the radix point.

In this example, column 7 is given by:

$$\text{Column } 7 = (a[4] \text{ AND } b[2]) \text{ XOR } (a[3] \text{ AND } b[3])$$

If the trailing one of a is in bit position n and the trailing "1" of b is in bit position m, then in general:

$$\text{Result bit} = (a[n+1] \text{ AND } b[m]) \text{ XOR } (a[n] \text{ AND } b[m+1])$$

Since it is known that the trailing "1" has a bit value of "1", i.e $a[n]=1$ and $b[m]=1$, the equation can be reduced to:

$$\text{Result bit} = a[n+1] \text{ XOR } b[m+1]$$

It is therefore possible to determine if the result of the multiplication will be odd or even from the operands. This can also be calculated using the trailing zero count as found in block 706 of FIG. 7, as the trailing zero count is the same as the bit position of the trailing "1". For example, in this embodiment of 32-bit operands, the value of bit 31 can be calculated as:

$$\text{Bit } 31 = a[tzc\_a+1] \text{ XOR } b[tzc\_b+1]$$

where $tzc\_a$ is the trailing zero count of operand a and $tzc\_b$ is the trailing zero count of operand b.

Therefore, by predetermining whether the result is odd or even, then it is not required to wait for bit 31 to be available from the unrounded result shown in FIG. 7, before block 708 can determine which multiplication result should be selected. This therefore avoids further logic delay.

The calculation of whether the result will be odd or even from the operands can also be used to optimise the system even further. This is shown by the second embodiment of the invention, which can be seen with reference to FIG. 9. The unit 900 is the same as that shown in FIG. 4 and described previously, except that there is a block 902 for calculating whether a rounding bit (or rounding bits if the unused bits in columns of the multiplication array require more than one bit to be inserted, as discussed previously) should be input to the multiplication array 402. The operation of the unit 900 is the same as that in FIG. 4, in that a rounding bit is inserted into a Wallace tree input corresponding to unused bits in a column of the multiplication array, and the result is rounded without incurring any extra delay. The difference in this embodiment is that block 902 determines whether the rounding bits need to be inserted into the array, in order to implement the round-to-nearest-even scheme.

Block 902 observes the operands 102 and 104 and calculates the total number of trailing zeroes. For the example of 32-bit operands, if there are exactly 30 trailing zeroes in total, then it is known that the result of the multiplication will end in x.5. If this is the case, then block 902 uses the number of trailing zeroes in each operand to calculate whether the result will be odd or even, i.e. it calculates the value of bit 31. If bit 31 is odd, then a rounding bit (or bits) is inserted into the multiplier array 402. If bit 31 is even, then no rounding bits are inserted into the array 402, and the result remains unrounded. If there are less than or more than 30 trailing zeroes, then the result will not end in x.5 and the rounding bit (or bits) will always be inputted into the multiplication array 402. Following the multiplication in the array 402, the sum and carry bits are added by the adder 406 to produce the final result.

This embodiment therefore provides a means for performing multiplication and rounding the result, with the result rounded to the nearest even number if the result ends in x.5, without incurring extra logic delay after the multiplication operation. By not incurring logic delay, chip area and power are also saved.

Although the invention has been described with reference to a multiplication operation, it will be appreciated by those skilled in the art that the invention may be used in other arithmetic operations in which the rounding follows the addition of multiple terms by a compression structure (such as a Wallace Tree). The terms to be added do not necessarily come from a multiplier structure, but could be from any operation that adds multiple independent values and forms a rounded result. For example, an instruction which performs a*b+c*d+e*f+g*h would also lend itself to rounding by adding extra bits early into the compression array.

It is intended that the present invention encompass such changes and modifications as fall within the scope of the appended claims.

What is claimed is:

1. An arithmetic unit comprising:
an encoding circuit arranged to receive first and second operands each having a bit length of m bits and to generate therefrom a number n of partial products of bit length of 2m bits including partial products of 2m bits;
a Wallace tree of a compression structure having m columns each having n inputs, wherein bits of said partial products are applied to said inputs for combining said partial products into a result whereby certain inputs of certain columns are unused, the result having a radix point; and
a rounding bit generator connected to supply two rounding bits to unused inputs in respective two of said columns at respective first and second bit positions to the right of the radix point to cause the first bit position of said result to be rounded.

2. The arithmetic unit according to claim 1, wherein the arithmetic unit is a multiplication unit.

3. The arithmetic unit according to claim 2, wherein the encoding circuit is a Booth encoder.

4. The arithmetic unit according to claim 2, wherein each of the first and second operands has a bit length of 32 bits and wherein the number of partial products is 17.

5. The arithmetic unit according to claim 4, wherein the bit position to cause said result to be rounded is bit position 29 of the respective two said columns.

6. The arithmetic unit according to claim 2, further comprising circuitry for determining whether or not rounding is necessary, said rounding bit being applied if it is determined to be necessary and not applied otherwise.

7. The arithmetic unit according to claim 6, wherein said determining circuit is arranged to detect a predetermined number of trailing zeros in one of said first and second operands and, on detection of said certain number, to examine the adjacent trailing one to determine if rounding is necessary.

8. A method of generating a rounded result comprising:
Receiving first and second operands at an encoding circuit, each having a bit length of m bits, and generating from the first and second operands, a number n of partial products of bit lengths of 2m bits;
applying bits of said partial products to inputs of a Wallace tree having m columns each having n inputs and combining said partial products into a result, the result having a radix point;
generating rounding bits from a rounding bit generator; and
applying two rounding bits to unused inputs in respective two of said columns at respective first and second bit positions to the right of the radix point to cause the first bit position of said result to be rounded.

9. The method according to claim 8, further comprising the step of determining whether or not rounding is necessary and selectively applying said rounding bit based on said determination.

10. The method according to claim 9, wherein the step of determining if rounding is necessary comprises detecting a predetermined number of trailing zeros and examining an adjacent trailing one when said predetermined number of trailing zeros is detected.

11. A multiplication unit comprising:
a Booth encoder arranged to receive first and second operands each having a bit length of m bits and to generate there from a number n of partial products of bit length of 2m bits including partial products of 2m bits;
a Wallace tree having m columns each having n inputs, wherein bits of said partial products are applied to said inputs for combining said partial products into a result wherein certain inputs of certain columns are unused, the result having a radix point; and
a rounding bit generator connected to supply two rounding bits to unused inputs in respective two of said columns at respective first and second bit positions to the right of the radix point to cause the first bit position of said result to be rounded.

12. The multiplication unit according to claim 11, wherein each of the first and second operands has a bit length of 32 bits.

13. The multiplication unit according to claim 12, wherein the number of partial products is 17.

14. The multiplication unit according to claim 13, wherein the bit position to cause said result to be rounded is bit position 29 of the respective two said columns.

15. The multiplication unit according to claim 11, further comprising circuitry to determine whether or not rounding is necessary, said rounding bit being applied if it is determined to be necessary and not applied otherwise.

16. The multiplication unit according to claim 15, wherein said determining circuit is arranged to detect a predetermined number of trailing zeros in one of said first and second operands.

17. The multiplication unit according to claim 16, wherein on detection of said certain number, said determining circuit is arranged to examine the adjacent trailing one to determine if rounding is necessary.

* * * * *